Jan. 18, 1938.　　　G. H. ACKER　　　2,105,577

LUBRICATING VALVE

Filed June 25, 1934

INVENTOR.
George H. Acker
BY
Ray, Oberlin & Ray
ATTORNEYS

Patented Jan. 18, 1938

2,105,577

UNITED STATES PATENT OFFICE 2,105,577

LUBRICATING VALVE

George H. Acker, Shaker Heights, Ohio, assignor to The Farval Corporation, Cleveland, Ohio, a corporation of Ohio Application June 25, 1934, Serial No. 732,293

10 Claims. (Cl. 184—7)

The present invention relates to a valve member for a lubricating system which is adapted to supply measured quantities of lubricant to several removed points from a central source of supply. The particular type of lubricating system in which the valve embodying the principles of the present invention is adapted to be used may be best termed the semi-progressive type. That is to say, such a semi-progressive type of lubricating system is one in which the lubricating valves are connected in series to a single supply line in which the lubricant is caused to flow in alternately opposite directions, and one in which the lubricating valves are adapted to deliver a measured quantity of lubricant through their discharge ports after the lubricant flow through the supply line has become complete and a certain pressure has been reached therein.

Therefore, the general object and nature of my invention is to provide an automatic measuring valve for such a semi-progressive type of system, which will be adapted to first effect certain valve connections to the valve discharge port, will next make a through connection in the lubricant supply line, and will finally effect a discharge of a measured quantity of lubricant.

A further object of the invention is to provide visible indicating means on the exterior of the lubricating valve by means of which the operation of the interior mechanism of the valve may be readily determined. The invention also contemplates the provision of means for adjustably regulating the quantity of lubricant supplied by the individual measuring valve.

Still another object of the invention is to effect a simplicity of design and construction whereby the lubricating valve may be rapidly and conveniently assembled and accordingly manufactured at a relatively low cost.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
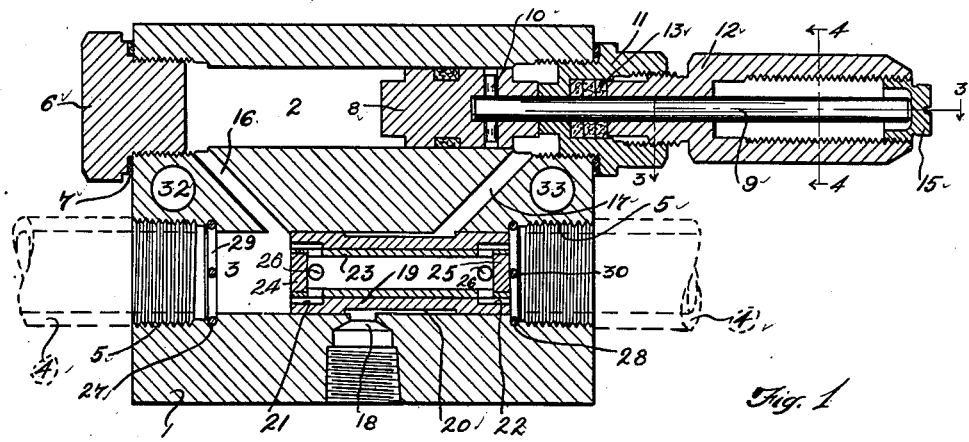
Figure 2:
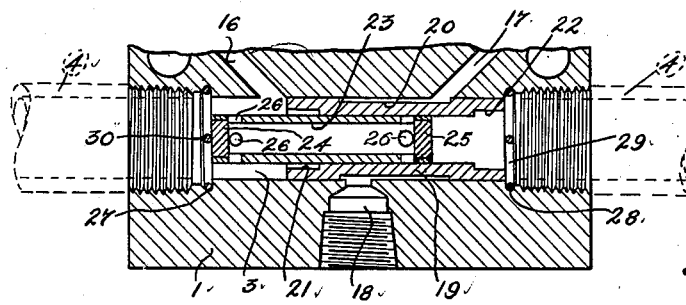
Figure 4:
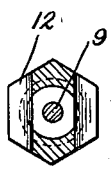
Figure 3:
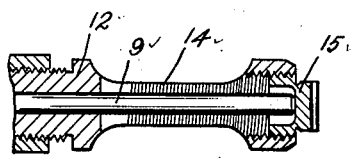
Figure 5:
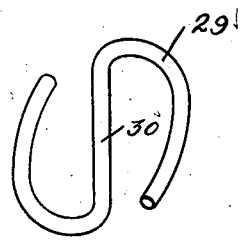

In said annexed drawing:

Fig. 1 is a sectional view of the lubricating valve constructed according to the principle of my invention; Fig. 2 shows a portion of the structure of Fig. 1, but with the movable parts of the valve chamber in a different position; Fig. 3 is a sectional view of the indicator portion of Fig. 1 and taken substantially along the line 3—3 and in the direction of the arrows; Fig. 4 is a sectional view taken upon a plane normal to that of Fig. 3 and substantially upon the line 4—4 of Fig. 1; Fig. 5 is an enlarged perspective view of one of the sleeve valve stop pins.

Now referring more particularly to the drawing, there has been shown therein a valve body 1 in which there is located the cylindrical measuring chamber 2 and the valve chamber 3. Each end of the valve chamber 3 is connected to the lubricant supply line 4 which has been represented in dotted lines. The valve chamber 3 in effect forms a continuation of the supply line 4, and the latter may be attached to the valve body 1 by means of the standard pipe thread connections 5.

One end of the measuring chamber 2 is closed by means of the cap screw 6 and the sealing gasket 7. A piston 8 is slidable in the cylindrical bore of the measuring chamber 2. An indicator rod 9 is attached to the piston 8 by means of a cross pin 10 and is adapted to extend outwardly to the exterior of the valve body 1. The indicator rod 9 passes through the bushing 11 which is threaded into the valve body 1. The packing nut 12 threadably engages the bushing 11 and is adapted to compress the packing material 13 in order to form a satisfactory seal around the indicator rod 9.

The packing nut 12 is cut away or relieved as at 14 in order to provide an opening through which visual inspection of the movement of the indicator rod might be had. A screw 15 threadably engages with the interior of the packing nut 12 and serves as means for limiting the outward movement of the indicator rod and correspondingly as a means for adjustably regulating the amount of travel of the piston 8.

Sloping or inclined passages 16 and 17 lead from the measuring chamber 2 to the valve chamber 3. A discharge port 18 leads from the medial portion of the valve chamber 3 and may be suitably threaded in order to accommodate the attachment of a conduit (not shown) leading to the bearing or point to be lubricated. A hollow sleeve valve fits closely within the bore of the valve chamber 3 and has a central portion 20 of reduced diameter which is adapted to make connections between either one of the passages 16 or 17 and the discharge port 18. The sleeve valve 19 also has the enlarged inner diameter portions 21 and 22 adjacent its ends.

A second sleeve valve 23 fits within the sleeve valve 19 and has preferably a rather free sliding fit therein in order that it might have a sliding movement with respect to the latter. Due to the relatively greater length of the bearing which the sleeve valve 23 has within the central bore of the sleeve valve 29, a relatively looser or freer fit may be provided without incurring the hazard of the troublesome leakage. Each end of the sleeve valve 23 is closed by means of the plugs 24 and 25 respectively. Immediately adjacent the closed ends of the inner sleeve valve 23, there are located a plurality of apertures 26.

At the ends of the valve chamber proper 3, and adjacent the threaded pipe connections 5 there are annular grooves 27 and 28 into which an S-shaped spring member 29 is fitted. The S-shaped spring member 29 has a medial portion 30 which serves as a cross pin against which the ends of the sleeve valves 19 and 23 abut, thus providing a suitable means for limiting the movement of the sleeve valves, while at the same time permitting flow of lubricant from the supply line 4 into the valve chamber 3.

Mounting screw holes 32 and 33 may be provided in the body 1 of the valve for conveniently attaching the latter to a support.

Having described the structure of my lubricating valve, the operation thereof will now be set forth:—

It is of course to be assumed that the lubricant supply line 4 will be connected to a main source of lubricant supply in which there is incorporated a flow directing means for alternately reversing the flow in the supply line until a predetermined pressure has been attained. Such mechanism being known in the art, it is not deemed necessary to herein further describe or illustrate it.

Directing attention to Fig. 1 and assuming that lubricant from a main source of supply is caused to flow from the right hand side of the valve body 1 to the left, it will be seen that the lubricant will enter the apertures 26, pass through the hollow center of the inner sleeve valve 23, out through the apertures 26 in the left hand end of the valve and thence through the left hand supply line 4. During such passage, however, the lubricant will impinge against the outside face of the right hand end 25 of the inner sleeve valve 23 and also against the inside face of the left hand end 24. In so doing, the inner sleeve valve 23 will be moved toward the left until the apertures 26 will have become closed due to the fact that they have been moved past the enlarged inner diameter portion 22 of the outer sleeve valve 19. Direct pressure then acting on the end 25 forces the sleeve valve 23 to move further to the left until it is stopped by the cross pin 30. In this manner the flow of lubricant through the supply line 4 has now been completely obstructed and further pressure therein will next be exerted against the right hand end of the outer sleeve valve 19 to in turn force the latter in a left hand direction against the cross pin 30 with which the inner sleeve valve 23 has already contacted. Such a position of the sleeve valve 19 and 23 has not been illustrated, since it is obvious that they will now occupy a position corresponding to a mirror image of the position shown in Fig. 1. When such position has been reached, passage of the lubricant through the supply line from the right to the left hand side of the valve is again unobstructed and the lubricant may accordingly continue to flow on to the next in the series of valves in the system.

When the outer sleeve valve 19 has been moved from its right to its left hand position, the passage 17 is connected to the right hand supply line which at this time is the inlet port of the valve, and the passage 16 has become connected through the reduced outer diameter portion 29 to the discharge port 18. When the pressure in the supply line 4 then builds up and becomes greater than that existing at the discharge port 18, the piston 8 will be forced over to the left hand end of the measuring chamber 2 and thereby deliver a measured quantity of lubricant out through the discharge port 18.

Reversal of flow of the lubricant through the supply line 4 effects a reversal of the cycle of operations from left to right substantially as has just been described and returns the movable parts of the valve to the position shown in Fig. 1, discharging lubricant from the right hand side of the measuring chamber 2 to the discharge port 18.

To summarize the above-described operation of the lubricating valve, it will be seen that it operates first, to move the valve parts into position to discharge the desired measured quantity of lubricant; second, to effect a through connection for the supply line; and third, to produce the discharge of the measured amount of lubricant.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a lubricating valve, the combination of a pair of ports adapted to receive and emit lubricant from a supply line in alternately opposite directions of flow, a measuring chamber connected to said ports, a piston in said chamber, a valve chamber connected to said ports and said measuring chamber, a discharge port connected to said valve chamber, and valve means in said valve chamber adapted to initially direct lubricant directly between said pair of ports and to finally direct lubricant from one of said ports to said measuring chamber and from the latter to said discharge port.

2. In a lubricating valve, the combination of an inlet port, an outlet port, a measuring chamber connected to both of said ports, a piston in said chamber, a valve chamber connected to said ports and to said measuring chamber, a discharge port connected to said valve chamber, and valve means in said valve chamber adapted to initially flow lubricant directly between said inlet and outlet ports and to finally direct lubricant from one of said ports to said measuring chamber and from the latter to said discharge port.

3. In a lubricating valve, the combination of a pair of ports adapted to receive and emit lubricant from a supply line in alternately opposite directions of flow, a measuring chamber connected to said ports, a piston in said chamber, a valve chamber connected to said ports and said measuring chamber, a discharge port connected to said valve chamber, and valve means in said valve chamber adapted to intitially direct lubricant directly between said pair of ports and to finally direct lubricant from one of said ports to said measuring chamber and from the latter to said discharge port while still maintaining the interconnection between said pair of ports.

4. In a lubricating valve, the combination of an inlet port, an outlet port, a measuring chamber connected to both of said ports, a piston in said chamber, a valve chamber connected to said ports and to said measuring chamber, a discharge port connected to said valve chamber, and valve means in said valve chamber adapted to initially flow lubricant directly between said inlet and outlet ports and to finally direct lubricant from one of said ports to said measuring chamber and from the latter to said discharge port while still maintaining the interconnection between said inlet and said outlet ports.

5. In a lubricating valve, the combination of a pair of ports adapted to receive and emit lubricant from a supply line in alternately opposite directions of flow, a measuring chamber connected to said ports, a piston in said chamber, a valve chamber connected to said ports and said measuring chamber, a discharge port connected to said valve chamber, a valve in said valve chamber movable to alternately connect one end of said measuring chamber to said discharge port and to simultaneously connect the other end of said measuring chamber to one of said pair of ports, and a second valve in said valve chamber normally interconnecting said pair of ports and intermittently disconnecting the latter pending the movement of said first-named valve.

6. In a lubricating valve, the combination of a pair of ports adapted to receive and emit lubricant from a supply line in alternately opposite directions of flow, a measuring chamber connected to said ports, a piston in said chamber, a valve chamber connected to said ports and said measuring chamber, a discharge port connected to said valve chamber, a hollow sleeve valve in said valve chamber movable to alternately connect one end of said measuring chamber to said discharge port and to simultaneously connect the other end of said measuring chamber to one of said pair of ports, and a second valve mounted within said hollow sleeve valve normally interconnecting said pair of ports and intermittently disconnecting the latter pending the movement of said first-named valve.

7. In a lubricating valve, the combination of a pair of ports adapted to receive and emit lubricant from a supply line in alternately opposite directions of flow, a measuring chamber connected to said ports, a piston in said chamber, a valve chamber connected to said ports and said measuring chamber, a discharge port connected to said valve chamber, a hollow sleeve valve in said valve chamber movable to alternately connect one end of said measuring chamber to said discharge port and to simultaneously connect the other end of said measuring chamber to one of said pair of ports, and a second valve mounted within said hollow sleeve valve and movable with respect to said first-named valve, ports in each end of said second valve adapted to open and close upon relative movement of the latter with respect to said first-named valve, and a passage connecting said last-named ports.

8. In a lubricating valve, the combination of an inlet port, an outlet port, a measuring chamber connected to both of said ports, a piston in said chamber, a valve chamber connected to said ports and to said measuring chamber, a discharge port connected to said valve chamber, valve means in said valve chamber adapted to initially flow lubricant directly between said inlet and outlet ports and to finally direct lubricant from one of said ports to said measuring chamber and from the latter to said discharge port, and means positioned in said inlet and outlet ports for limiting the movement of said valve means without preventing lubricant flow through said ports.

9. In a lubricating valve adapted to receive and emit lubricant from a single supply line, the combination of a measuring chamber, a discharge port, and valve means for initially making a through connection with said supply line, subsequently closing said through connection, then directing lubricant from said supply line to one end of said measuring chamber, and displacement means in said measuring chamber for forcing lubricant from the other end thereof while said valve means connects said other end of said measuring chamber to said discharge port, and simultaneously re-establishes such through connection.

10. In a lubricating system, the combination of a series of lubricating valves, a supply line connecting said valves and adapted to conduct lubricant in alternately opposite directions of flow, a measuring chamber and a discharge port for each of said valves, and valve means in said valves for initially making a through connection with said supply line, subsequently closing said through connection, then directing lubricant from said supply line to one end of said measuring chamber, and displacement means in said measuring chamber for forcing lubricant from the other end thereof while said valve means connects said other end of said measuring chamber to said discharge port and simultaneously re-establishes such through connection.

GEORGE H. ACKER.